(12) United States Patent
Sameshima et al.

(10) Patent No.: US 11,680,652 B2
(45) Date of Patent: Jun. 20, 2023

(54) VALVE DEVICE

(71) Applicant: FUTABA INDUSTRIAL CO., LTD., Okazaki (JP)

(72) Inventors: Shunsuke Sameshima, Okazaki (JP); Kosuke Onoda, Okazaki (JP); Masayuki Sudo, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 17/575,217

(22) Filed: Jan. 13, 2022

(65) Prior Publication Data

US 2022/0235874 A1 Jul. 28, 2022

(30) Foreign Application Priority Data

Jan. 27, 2021 (JP) .............................. JP2021-011235

(51) Int. Cl.
*F16K 15/03* (2006.01)

(52) U.S. Cl.
CPC .................................. *F16K 15/033* (2013.01)

(58) Field of Classification Search
CPC ...... F16K 15/023; F16K 15/033; F01N 1/163; F01N 1/165; Y10T 137/7898; Y10T 137/7903
See application file for complete search history.

(56) References Cited

U.S. PATENT DOCUMENTS

| 386,461 A | * | 7/1888 | Goll | ...................... F16K 15/033 |
| | | | | 251/303 |
| 4,005,732 A | * | 2/1977 | Buckner | ................ F16K 15/038 |
| | | | | 137/512.1 |
| 4,128,111 A | * | 12/1978 | Hansen | ................... F16K 15/03 |
| | | | | 137/515.7 |
| 5,067,506 A | | 11/1991 | Ball et al. | |
| 5,355,673 A | | 10/1994 | Sterling et al. | |

(Continued)

FOREIGN PATENT DOCUMENTS

| CN | 103277170 A | 9/2013 |
| JP | H08200541 A | 8/1996 |

(Continued)

OTHER PUBLICATIONS

Examination Report for Indian Patent Application No. 202234002429, dated Aug. 18, 2022, 5 pages.

(Continued)

*Primary Examiner* — Kevin F Murphy
(74) *Attorney, Agent, or Firm* — Withrow & Terranova, P.L.L.C.; Vincent K. Gustafson (57) ABSTRACT

A valve device is configured to adjust an opening degree of a flow path for fluid, and includes an axial member, a valve body, and a biasing member. The axial member is configured to be fixed to the flow path. The valve body is rotatable about the axial member, and is configured to be rotated in a closing direction in which the opening degree is reduced, and to be rotated, by the use of a fluid flowing down through the flow path, in an opening direction in which the opening degree is increased. The biasing member is provided to the axial member inside the flow path, and is configured to bias the valve body to rotate in the closing direction.

13 Claims, 5 Drawing Sheets

(56) References Cited

U.S. PATENT DOCUMENTS

| | | | | |
|---|---|---|---|---|
| 5,392,810 A * | 2/1995 | Cooper | ................ | F16K 15/038 |
| | | | | 137/527 |
| 5,709,241 A * | 1/1998 | Iwata | ...................... | F01N 1/166 |
| | | | | 137/527 |
| 8,662,119 B2 * | 3/2014 | Burris | ...................... | B67D 7/52 |
| | | | | 141/311 A |
| 9,540,995 B2 * | 1/2017 | Houtschilt | .............. | F02B 77/00 |
| 10,436,088 B2 * | 10/2019 | Thomas | ................ | F02D 9/1015 |
| 2016/0102770 A1 | 4/2016 | Wakatsuki et al. | | |

FOREIGN PATENT DOCUMENTS

| | | |
|---|---|---|
| JP | H094726 A | 1/1997 |
| JP | 2010133345 A | 6/2010 |
| JP | 2016079807 A1 | 5/2016 |

OTHER PUBLICATIONS

Notice of Reasons for Refusal for Japanese Patent Application No. 2021011235, dated Dec. 13, 2022, 8 pages.

* cited by examiner

VALVE DEVICE

CROSS-REFERENCE TO RELATED APPLICATIONS

This application claims the benefit of Japanese Patent Application No. 2021-011235 filed on Jan. 27, 2021 with the Japan Patent Office, the entire disclosure of which is incorporated herein by reference.

BACKGROUND

The present disclosure relates to a valve device provided in a flow path for fluid.

There has been known a valve device that opens and closes an exhaust pipe through which an exhaust gas from a vehicle engine flows down. For example, in a valve mechanism disclosed in Japanese Unexamined Patent Application Publication No. 2016-79807, a valve member that opens and closes an exhaust pipe is integrally formed with a rotation axis that is provided in a penetrating manner through the exhaust pipe. A part of the rotation axis exposed outside of the exhaust pipe is provided with a link arm, and the valve member is biased by a spring that is connected to the link arm as to rotate toward a closed position.

SUMMARY

However, the valve mechanism disclosed in JP 2016-79807 A comprises members including the link arm and the spring, which are provided outside of the exhaust pipe. This results in a larger space for arranging the valve mechanism.

In one aspect of the present disclosure, it is preferable to reduce the space for arranging the valve device.

One aspect of the present disclosure provides a valve device that is configured to adjust an opening degree of a flow path for fluid, and comprises: an axial member; a valve body; and a biasing member. The axial member is configured to be fixed in the flow path. The valve body is rotatable about the axial member, and is configured to be rotated in a closing direction in which the opening degree is reduced, and to be rotated, by the use of a fluid flowing down through the flow path, in an opening direction in which the opening degree is increased. The biasing member is provided to the axial member inside the flow path, and is configured to bias the valve body to rotate in the closing direction.

According to the above-described configuration, the biasing member is disposed inside the flow path for fluid, and thus the space for arranging the valve device can be reduced.

In one aspect of the present disclosure, a position where the valve body rotating in the closing direction reaches may be the closed position. When positioned in the closed position, the valve body may be tilted with respect to a cross section perpendicular to a flow direction of the fluid in the flow path.

According to the above-described configuration, the valve body positioned in the closed position is tilted, and thus a first portion, which is situated on a downstream side with respect to a central axis of rotation of the valve body, and a second portion, which is situated on an upstream side, are formed in the valve body. Due to the tilt, the exhaust gas having reached the valve body flows toward the first portion along the valve body, and the exhaust gas flow concentrates on the first portion. Consequently, a dynamic pressure of the exhaust gas at the first portion exceeds the dynamic pressure of the exhaust gas at the second portion, and a torque is generated that rotates the valve body in a direction (in other words, the opening direction) in which the first portion is displaced toward the downstream side.

This enables, when the dynamic pressure of the exhaust gas rises, to rotate the valve body that is positioned in the closed position and biased in the closing direction by the biasing member in the opening direction, without giving any consideration to an area ratio between two areas situated on both sides of the central axis in the valve body. Thus, the position of the central axis can be determined more flexibly, allowing a more flexible design of the valve device.

In one aspect of the present disclosure, the central axis, which is defined by the valve body rotating about the axial member, may pass through a substantial center of the flow path.

The above-described configuration facilitates a more uniform forming of the flow path for fluid on both sides of the central axis of the valve body. Thus, the exhaust gas passing through the valve device can flow more smoothly.

In one aspect of the present disclosure, the biasing member may be disposed inside the valve body.

According to the above-described configuration, the exhaust gas can flow more smoothly in the peripheral of the valve body.

In one aspect of the present disclosure, the valve device may be mounted to a vehicle. The fluid may be an exhaust gas from a vehicle engine.

According to the above-described configuration, a space for arranging the valve device provided to an exhaust gas flow path in the vehicle can be reduced.

In one aspect of the present disclosure, the valve device may be provided in a muffler through which the exhaust gas flows down.

According to the above-described configuration, the space for arranging the valve device provided in the muffler can be reduced.

In one aspect of the present disclosure, the biasing member may include at least one tension coil spring having a first end connected to the axial member, and a second end connected to the valve body.

According to the above-described configuration, the valve body can be favorably biased.

In one aspect of the present disclosure, a position where the valve body rotating in the closing direction reaches may be the closed position. When positioned in the closed position, the valve body may be tilted with respect to the cross section perpendicular to the flow direction of the fluid in the flow path. The at least one tension coil spring may be configured such that, when the valve body is positioned in the closed position, the first end is situated on the upstream side with respect to a reference line, and the second end is situated on the downstream side with respect to the central axis, which is defined by the valve body rotating about the axial member, or, the first end is situated on the downstream side with respect to the reference line, and the second end is situated on the upstream side with respect to the central axis. The reference line may be a straight line that connects the second end of the at least one tension coil spring and the central axis.

According to the above-described configuration, the at least one tension coil spring may generate a torque that rotates the valve body positioned in the closed position in the closing direction. Thus, the valve body can be favorably biased.

In one aspect of the present disclosure, the axial member may further comprise a link member provided in a protruding manner from an outer peripheral surface of the axial member. The first end of the at least one tension coil spring may be connected to the link member.

According to the above-described configuration, a distance between the first end of the at least one tension coil spring and the reference line can be easily secured. Thus, the torque generated by the at least one tension coil spring can be easily adjusted.

In one aspect of the present disclosure, the second end of the at least one tension coil spring may be connected to an end of the valve body or in a vicinity thereof.

According to the above-described configuration, the valve body can be favorably biased.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

The present disclosure is not limited to embodiments described below and may be variously modified within the technical scope of the present disclosure.

First Embodiment

1. Overall Configuration of Valve Device

Figure 1:
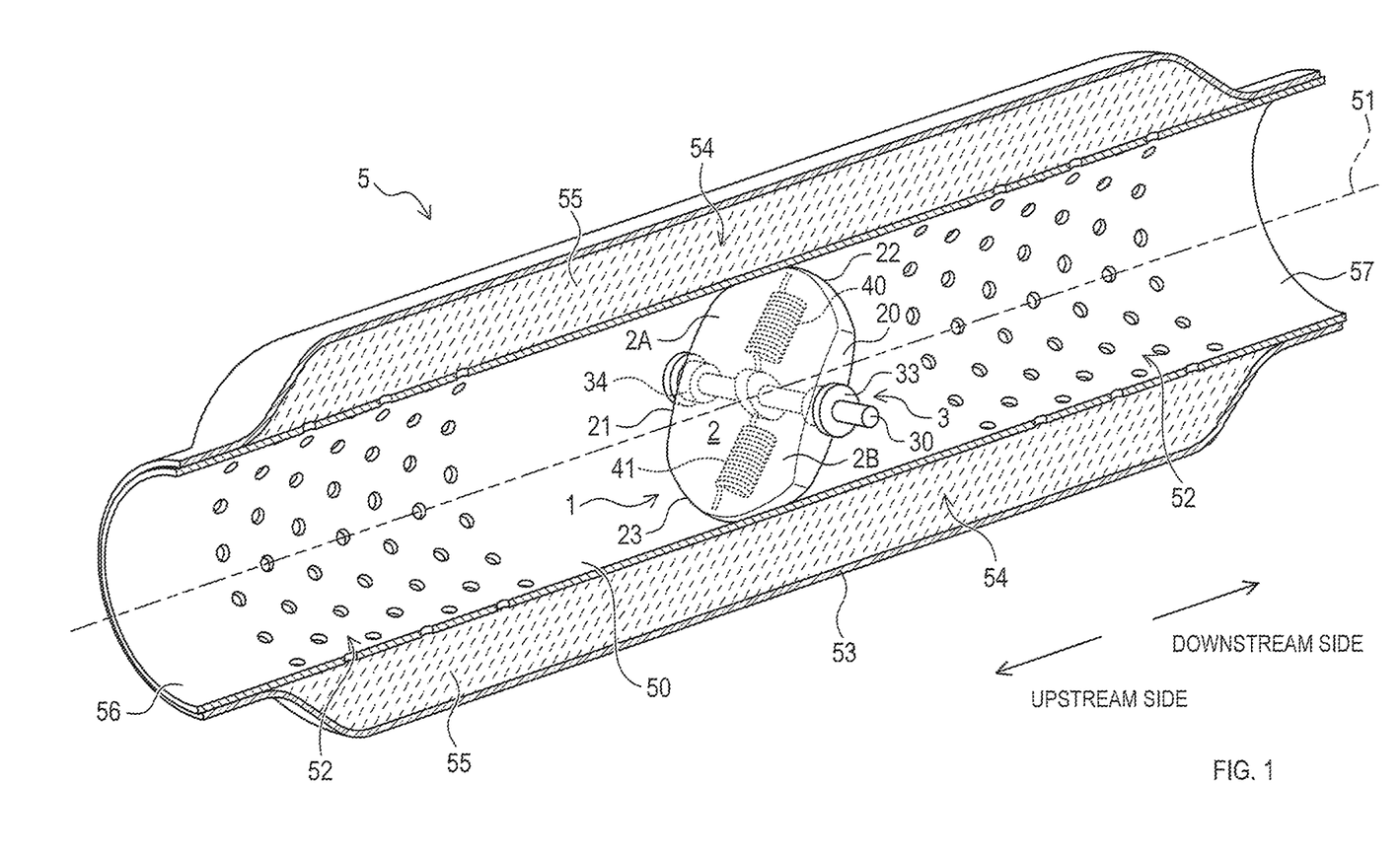
FIG. 1 is a cross-sectional perspective view of a muffler according to a first embodiment.

A valve device 1 according to a first embodiment is mounted into a pipe (in other words, an exhaust gas flow path) through which an exhaust gas from a vehicle engine flows (see, FIG. 1). More specifically, the valve device 1 is provided in an inner pipe 50 of a muffler 5 that is mounted in the exhaust gas flow path of the vehicle. The inner pipe 50 is, for example, a cylindrical member extending substantially linearly. Hereinafter, a cross section taken perpendicular to a flow direction of the exhaust gas in the inner pipe 50 will be simply referred to as a cross section, and a line passing through a substantial center of the cross section will be referred to as an axial line 51. The valve device 1 is configured to adjust an opening degree of the inner pipe 50, and comprises: a valve body 2; an axial member 3; and first and second springs 40, 41.

2. Axial Member

Figure 2:
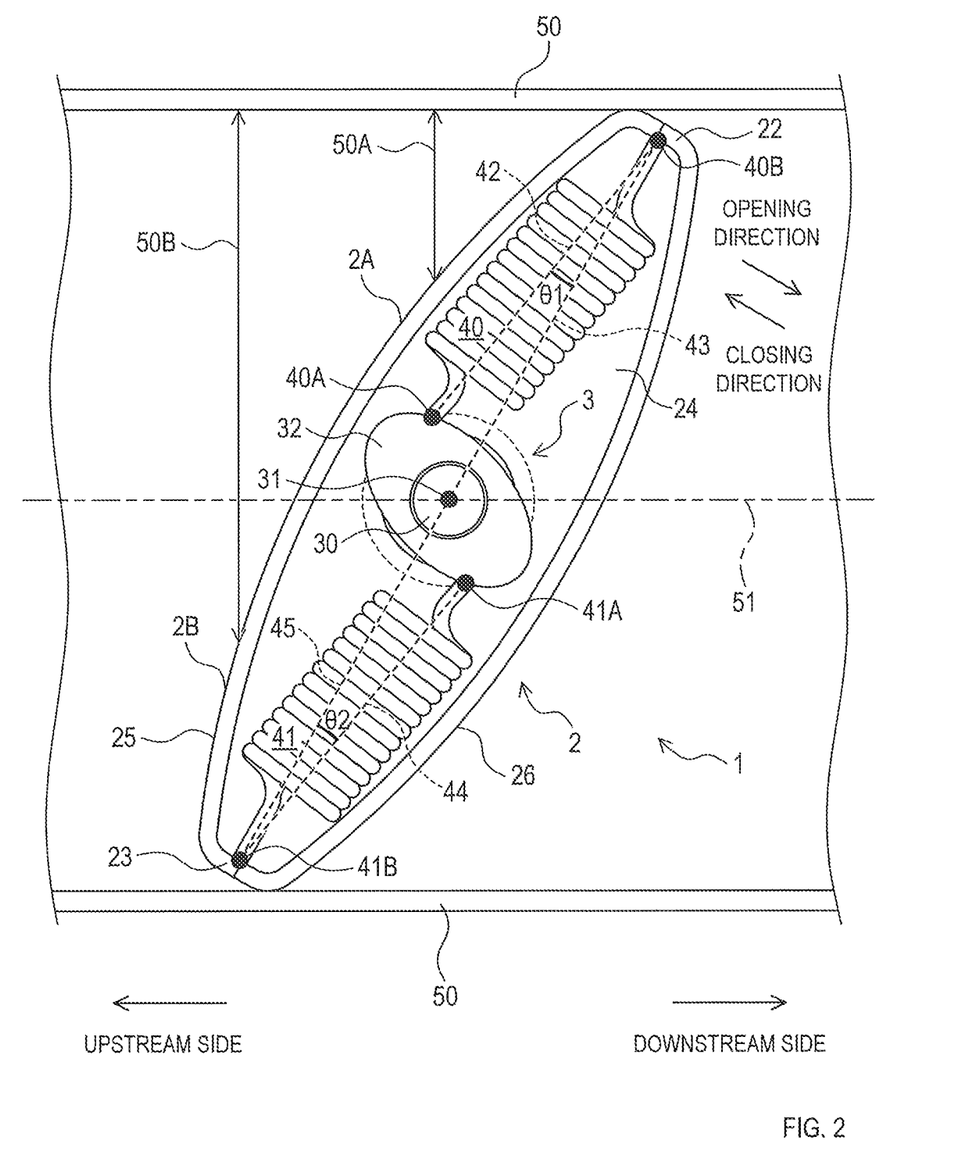
FIG. 2 is a cross-sectional view, taken along a flow direction of an exhaust gas, of an inner pipe of the muffler and a valve device according to the first embodiment, in which a valve body of the valve device is positioned in a closed position.
Figure 3:
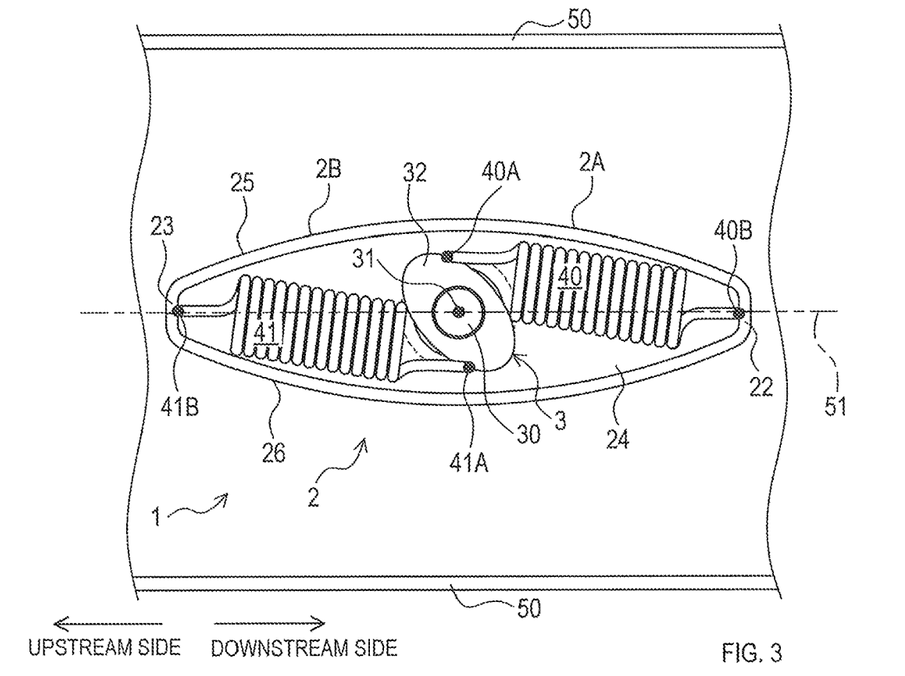
FIG. 3 is a cross-sectional view, taken along the flow direction of the exhaust gas, of the inner pipe of the muffler and the valve device according to the first embodiment, in which the valve body of the valve device is positioned in an open position.

The axial member 3 is fixed to the inner pipe 50, and comprises: a rotation axis 30; a link member 32; and first and second supporting members 33, 34 (see, FIGS. 1 to 3).

The rotation axis 30 is a rod-shaped member provided in a penetrating manner through the inner pipe 50, and rotatably supports the valve body 2. The rotation axis 30 is fixed to the inner pipe 50, and is not rotatable with respect to the inner pipe 50. The rotation axis 30 has, for example, a cylindrical shape, and extends along a direction (hereinafter, to be also referred to as a width direction) substantially perpendicular to the flow direction of the exhaust gas (in other words, a direction along the axial line 51) in the inner pipe 50. A central axis 31 defined by the valve body 2 rotating about the rotation axis 30 intersects the axial line 51 of the inner pipe 50, or passes through a vicinity of the axial line 51. In other words, the central axis 31 passes through a substantial center of the inner pipe 50.

In the first embodiment, for example, the rotation axis 30 is arranged in a penetrating manner through a wall surface of the inner pipe 50, and both ends of the rotation axis 30 are exposed outside of the inner pipe 50. However, the configuration of the both ends of the rotation axis 30 is not limited to this, and they may be situated inside the inner pipe 50.

The link member 32 is fixed to the rotation axis 30 at a substantial center thereof in the width direction. The link member 32 has a substantially oval shape, and the rotation axis 30 penetrates a substantial center of the link member 32. In other words, the link member 32 is arranged to protrude from an outer peripheral surface of the rotation axis 30. A first end of the link member 32 along a lengthwise direction thereof is situated on the upstream side with respect to the rotation axis 30, and a second end of the link member 32 is situated on the downstream side of the rotation axis 30.

The first and second supporting members 33, 34 each are fixed to the rotation axis 30 in a vicinity of each end thereof, and abut an inner peripheral surface of the inner pipe 50. The valve body 2 is interposed between the first supporting member 33 and the second supporting member 34. The first and second supporting members 33, 34 each have a cylindrical shape with a diameter larger than that of the rotation axis 30, and are formed concentrically with the rotation axis 30. The first and second supporting members 33, 34 each comprise an outer portion that abuts the inner peripheral surface of the inner pipe 50, and an inner portion that abuts an inside the outer portion. The inner portion has a diameter smaller than that of the outer portion.

3. Valve Body

The valve body 2 is flat, and has a substantially circular shape as viewed from the front, including a hollow inside. An edge of the valve body 2 includes first and second side portions 20, 21 formed opposite to each other in a lateral direction, and first and second arc portions 22, 23 formed opposite to each other in a longitudinal direction perpendicular to the lateral direction (see, FIGS. 1 to 3). Both ends of the first arc portion 22 are respectively joined with one ends of the first and second side portions 20, 21, and both ends of the second arc portion 23 are respectively joined with the other ends of the first and second side portions 20, 21. The valve body 2 in a side view has a thickness increasing to a center in the longitudinal direction.

The valve body 2 is provided rotatable about the axial member 3 (more specifically, about the rotation axis 30). The rotation axis 30 penetrates the valve body 2 in the substantially lateral direction through a substantial center in the longitudinal direction. The valve body 2 rotates about the rotation axis 30 to vary the opening degree of the inner pipe 50. Hereinafter, a rotating direction of the valve body 2 in which the opening degree of the inner pipe 50 is reduced will be referred to as a closing direction, and a rotating direction of the valve body 2 in which the opening degree of the inner pipe 50 is increased will be referred to as an opening direction.

That is, the first side portion 20 is rotatably supported by the first supporting member 33 of the rotation axis 30, which penetrates the first side portion 20. Specifically, an inner portion of the first supporting member 33 is situated inside the valve body 2, and an outer portion of the first supporting member 33 is situated between the first side portion 20 and the inner peripheral surface of the inner pipe 50. Similarly to the first side portion 20, the second side portion 21 is rotatably supported by the second supporting member 34 of the rotation axis 30, which penetrates the second side portion 21.

The valve body 2 comprises first and second valve bodies 25, 26. Each of the first and second valve bodies 25, 26 viewed in the lateral direction is a plate-like member curved in an arc shape. The valve body 2 is formed by joining the first valve body 25 and the second valve body 26 that are opposite to each other, and an internal space 24 is formed between the first valve body 25 and the second valve body 26. The first valve body 25 is situated on the upstream side, and the second valve body 26 is situated on the downstream side.

4. First and Second Springs

The first and second springs 40, 41 are configured as tension coil springs, provided to the rotation axis 30, and function as the biasing members to bias the valve body 2 to rotate in the closing direction (see, FIGS. 1 to 3). At least a part of each of the first and second springs 40, 41 is connected to the link member 32.

The first and second springs 40, 41, as viewed in the flow direction of the exhaust gas, are situated inside the edge of the valve body 2, and are disposed in the internal space 24 of the valve body 2. Specifically, a first end 40A of the first spring 40 is connected to a part of the link member 32 on the first valve body 25 side with respect to the central axis 31, and a second end 40B of the first spring 40 is connected to a part of the first arc portion 22 on the internal space 24 side. Also, a first end 41A of the second spring 41 is joined to a part of the link member 32 on the second valve body 26 side with respect to the central axis 31, a second end 41B of the second spring 41 is connected to a part of the second arc portion 23 on the internal space 24 side.

5. Closed Position and Open Position

A position of the valve body 2 when the opening degree of the inner pipe 50 reaches its maximum is referred to as an open position (see, FIG. 3). The valve body 2 positioned in the open position is in a state of being arranged along the flow direction of the exhaust gas.

On the other hand, the position of the valve body 2 when the opening degree of the inner pipe 50 reaches its minimum is referred to as a closed position (see, FIG. 2). In the first embodiment, for example, the valve body 2 positioned in the closed position is tilted with respect to a cross section of the inner pipe 50. At the same time, the first and second arc portions 22, 23 each abut the inner peripheral surface of the inner pipe 50, and form no gaps between each of the first and second arc portions 22, 23 and the inner peripheral surface of the inner pipe 50. Also, the first arc portion 22 is situated on the downstream side with respect to the central axis 31, and the second arc portion 23 is situated on the upstream side with respect to the central axis 31.

In the first embodiment, there are gaps formed between each of the first and second side portion 20, 21 of the valve body 2 and the inner peripheral surface of the inner pipe 50. However, the present disclosure is not limited to this, and, for example, the inner pipe 50 may be formed in another shape so that there are no gaps formed between each of the first and second side portions 20, 21 and the inner peripheral surface of the inner pipe 50.

6. Rotation of Valve Body

Each of the first and second springs 40, 41 is provided inside the valve body 2 in an expanded manner, and generates a restoring force that contracts the spring (see, FIGS. 2, 3). Specifically, when the valve body 2 is positioned in the closed position, the first and second springs 40, 41 expand the least, and the restoring force is the smallest. As the valve body 2 gets closer to the open position, the first and second springs 40, 41 expand more and the restoring force increases.

The restoring force of each of the first, second springs 40, 41 generates a torque that rotates the valve body 2 toward the closed position (in other words, in the closing direction). More specifically, the first arc portion 22 of the valve body 2 is rotated toward the upstream side, and the second arc portion 23 is rotated toward the downstream side, by the restoring force.

Specifically, when the valve body 2 and the first and second springs 40, 41 are viewed in the width direction, a straight line that connects the first end 40A of the first spring 40 and the second end 40B is referred to as a first straight line 42 (see, FIG. 2). Also, a straight line that connects the second end 40B and the central axis 31 defined by the rotating valve body 2 is referred to as a first reference line 43. Furthermore, a straight line that connects the first end 41A of the second spring 41 and the second end 41B is referred to as a second straight line 44, and a straight line that connects the second end 41B and the central axis 31 is referred to as a second reference line 45.

When the valve body 2 is positioned in the closed position, the first end 40A of the first spring 40 is situated on the first valve body 25 side with respect to the central axis 31, and an angle $\theta 1$ is formed between the first straight line 42 and the first reference line 43. Also, the first end 41A of the second spring 41 is situated on the second valve body 26 side with respect to the central axis 31, and an angle $\theta 2$ is formed between the second straight line 44 and the second reference line 45.

In other words, when the valve body 2 is positioned in the closed position, in the first spring 40, the first end 40A is situated on the upstream side with respect to the first reference line 43, and the second end 40B is situated on the downstream side with respect to the central axis 31. Also, in the second spring 41, the first end 41A is situated on the downstream side with respect to the second reference line 45, and the second end 41B is situated on the upstream side with respect to the central axis 31.

As described above, the valve body 2 is rotatable about the rotation axis 30, and the link member 32 is fixed to the rotation axis 30. Thus, the valve body 2 is rotated in the closing direction by the restoring forces of the first, second springs 40, 41. As the angles θ1, θ2 increase, the restoring forces increase. Also, degrees of the angles θ1, θ2 may be nearly equal or may be different from each other. The degrees of the angles θ1, θ2 may be appropriately adjusted so that the valve device 1 can be applied in various flow paths for exhaust gas having different exhaust gas dynamic pressures.

The valve body 2 that is tilted with respect to the cross section of the inner pipe 50 is rotated in the opening direction by the exhaust gas flowing through the inner pipe 50. That is, when the valve body 2 is tilted such that the first arc portion 22 is situated on the downstream side with respect to the central axis 31 of the rotation axis 30, and the second arc portion 23 is situated on the upstream side with respect to the central axis 31, the exhaust gas having reached the valve body 2 flows toward the first arc portion 22 along the valve body 2. Accordingly, the exhaust gas flow concentrates in a vicinity of the first arc portion 22. Consequently, the dynamic pressure of the exhaust gas applied to a part of the valve body 2 on the first arc portion 22 side with respect to the central axis 31 (hereinafter, to be referred to as a first portion 2A) exceeds the dynamic pressure of the exhaust gas applied to a part of the valve body 2 on the second arc portion 23 side with respect to the central axis 31 (hereinafter, to be referred to as a second portion 2B).

More specifically, when the valve body 2 is tilted as described above, a second cross section 50B of the inner pipe 50, which intersects the second portion 2B, is greater than a first cross section 50A of the inner pipe 50, which intersects the first portion 2A. Accordingly, the dynamic pressure of the exhaust gas that abuts the first portion 2A of the valve body 2 exceeds the dynamic pressure of the exhaust gas that abuts the second portion 2B. Herein, the first cross section 50A means a partial area of the cross section of the inner pipe 50 taken on the first portion 2A, through which the exhaust gas on the upstream side with respect to the valve body 2 passes. Also, the second cross section 50B means a partial area of the cross section of the inner pipe 50 taken on the second portion 2B, through which the exhaust gas on the upstream side with respect to the valve body 2 passes.

Accordingly, a force generated by a difference that is calculated by deducting the dynamic pressure of the exhaust gas applied to the second portion 2B from the dynamic pressure of the exhaust gas applied to the first portion 2A is exerted on the valve body 2 tiled as described above. Thus, when the force exceeds the torque generated by the first and second springs 40, 41, the valve body 2 is rotated in the opening direction.

7. Configuration of Muffler

The muffler 5 of the first embodiment is disposed in the exhaust gas flow path from the vehicle engine, and comprises the inner pipe 50 as described above, and an outer pipe 53 (see, FIG. 1).

Openings of both ends of the inner pipe 50 each form an inlet 56 and an outlet 57 for the exhaust gas in the muffler 5. The valve device 1 is provided at a substantial center of the inner pipe 50 in a direction along the axial line 51. A plurality of holes 52 are formed into the inner pipe 50 on both the upstream and downstream sides with respect to the valve device 1, and the plurality of holes 52 communicate an outer space 54 with a space inside the inner pipe 50.

The outer pipe 53 is a cylindrical member extending linearly, and arranged around an outer peripheral surface of the inner pipe 50. The outer pipe 53 and the inner pipe 50 together form a double pipe. The outer space 54 encircling the inner pipe 50 is formed between the outer pipe 53 and the inner pipe 50. Both ends of the outer pipe 53 each are provided with a joining part that closes a gap between the outer pipe 53 and the inner pipe 50 and, is joined to the outer peripheral surface of the inner pipe 50.

The outer space 54 is provided with, for example, a sound absorption material such as a glass wool 55. Various materials having sound absorbency, including a porous material, may be used as the sound absorption material besides the glass wool 55. The outer space 54 may be configured not to include the sound absorption material.

The exhaust gas having flown in from the inlet 56 of the muffler 5 first flows through the inner pipe 50. When a dynamic pressure of the exhaust gas is low and the valve device 1 is positioned in the closed position, the exhaust gas mainly does not pass through the valve device 1, and flows out to the outer space 54 via the plurality of holes 52 on the upstream side with respect to the valve device 1. The exhaust gas having flown out to the outer space 54 passes through the glass wool 55, whereby a muffling is performed. Subsequently, the exhaust gas passes through the plurality of holes 52 on the downstream side with respect to the valve device 1, and flows into the inner pipe 50, and then flows out to an exterior of the muffler 5 from the outlet 57.

On the other hand, in response to the dynamic pressure of the exhaust gas having flown in from the inlet 56 rising, the valve device 1 is rotated in the opening direction and the opening degree of the inner pipe 50 is increased. This results in a gradual increase of an amount of the exhaust gas passing through the valve device 1.

Second Embodiment

8. Outline

Figure 4:
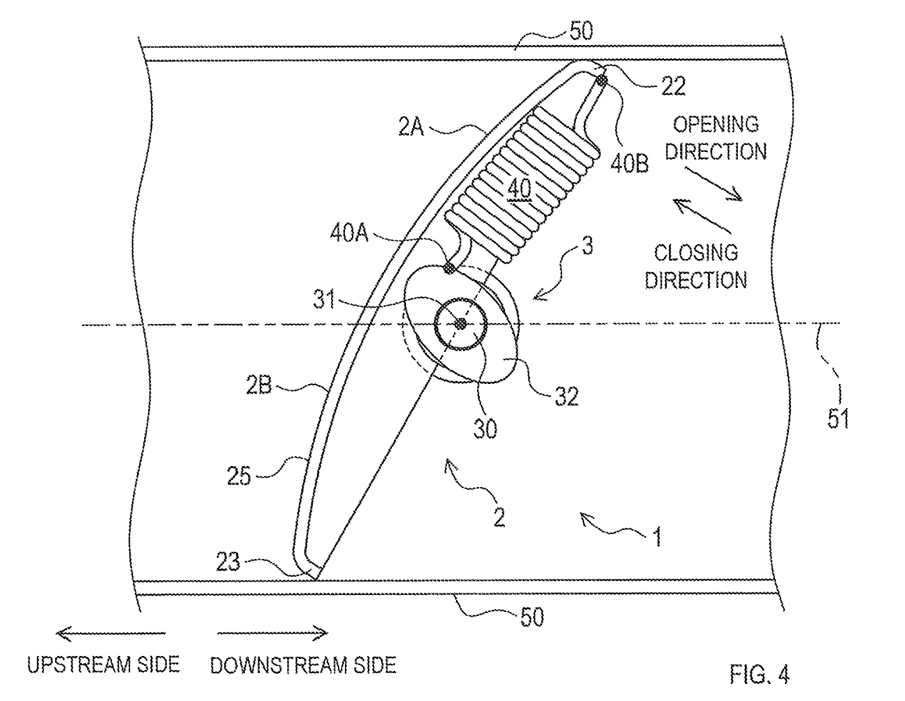
FIG. 4 is a cross-sectional view, taken along the flow direction of the exhaust gas, of the inner pipe the muffler and the valve device according to a second embodiment, in which the valve body of the valve device is positioned in the closed position.

The valve device 1 of the second embodiment has a similar configuration to that of the first embodiment, except for the valve body 2 and the biasing member (see, FIG. 4). Specifically, the valve body 2 of the second embodiment comprises the first valve body 25, but does not comprise the second valve body 26. The biasing member of the second embodiment comprises the first spring 40, but does not comprise the second spring 41. With such a structure, similarly to the valve device 1 of the first embodiment, the opening degree of the inner pipe 50 can be adjusted. The biasing member of the valve body 2 of the second embodiment may be configured to comprise the second spring 41, but not to comprise the first spring 40.

Third Embodiment

9. Outline

Figure 5:
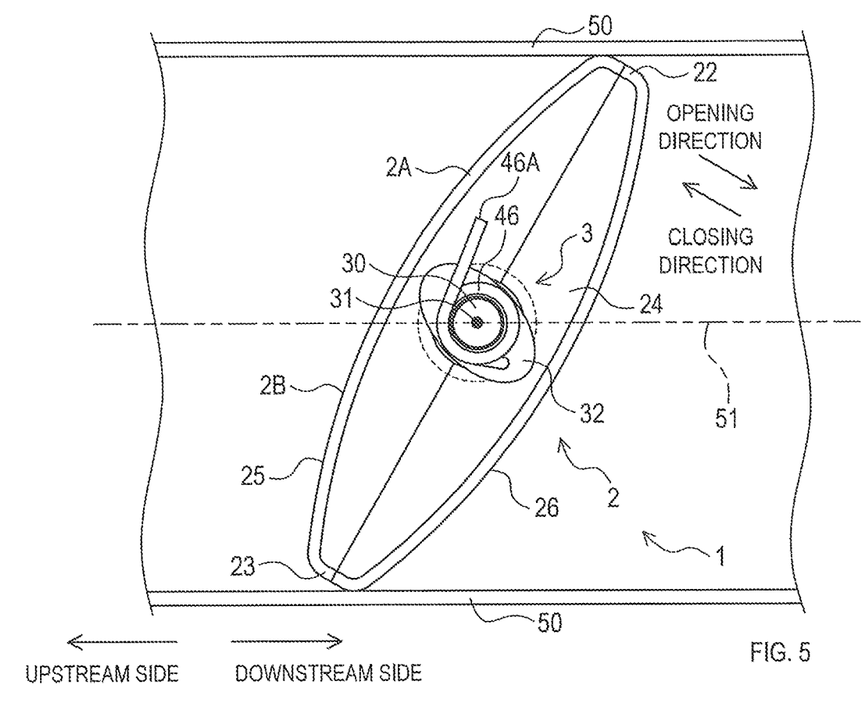
FIG. 5 is a cross-sectional view, taken along the flow direction of the exhaust gas, of the inner pipe of the muffler and the valve device according to a third embodiment, in which the valve body of the valve device is positioned in the closed position.

The valve device 1 of the third embodiment has a similar configuration to that of the first embodiment, except for the biasing member (see, FIG. 5). Hereinbelow, descriptions will be given of differences between the third embodiment and the first embodiment.

In the third embodiment, instead of the first and second springs 40, 41, a helical torsion spring 46 is used as the biasing member. The helical torsion spring 46 is provided to the rotation axis 30 at the substantial center thereof in the width direction, so as to surround the rotation axis 30. The helical torsion spring 46A includes a first end 46A that abuts the first valve body 25, and a second end that is fixed to the rotation axis 30.

The helical torsion spring 46 is disposed inside the valve body 2 in such a manner that the first end 46A is pressed toward the downstream side, and generates a restoring force that displaces the first end 46A to the upstream side. The restoring force of the helical torsion spring 46 generates, similarly to the first embodiment, a torque that rotates the valve body 2 in the closing direction. As the valve body 2 is displaced toward the open position from the closed position, the first end 46A is displaced toward the downstream side. Accordingly, similarly to the first embodiment, as the valve body 2 gets closer to the open position, the helical torsion spring 46 is compressed and the restoring force increases.

Similarly to the first embodiment, when the force applied to the valve body 2 by the dynamic pressure of the exhaust gas exceeds the torque generated by the helical torsion spring 46, the valve body 2 is rotated in the opening direction.

Fourth Embodiment

10. Outline

Figure 6:
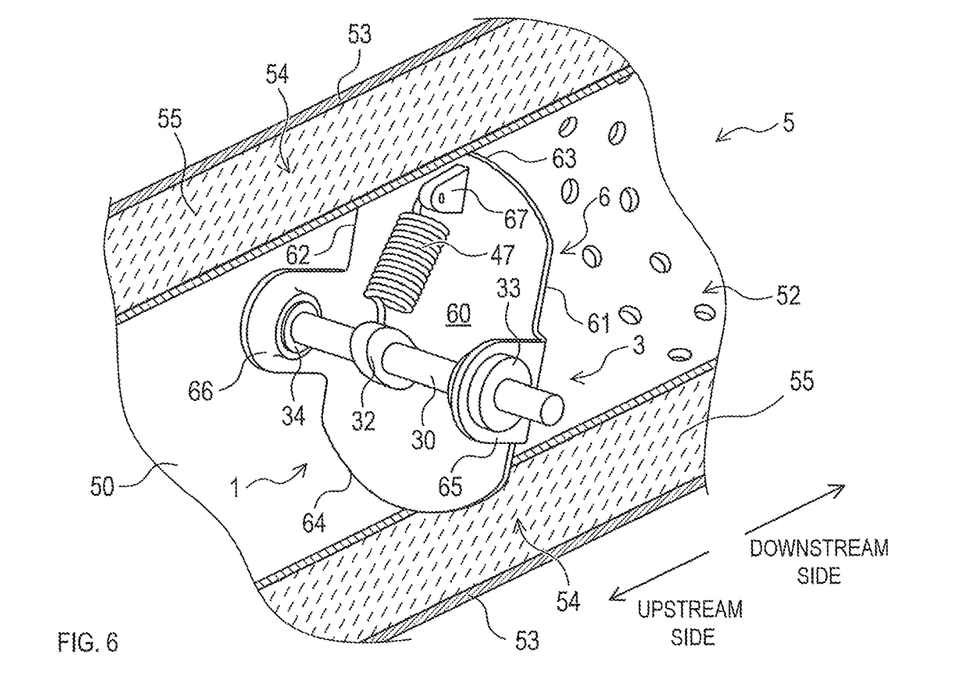
FIG. 6 is an enlarged cross-sectional perspective view of the muffler, with the valve device according to a fourth embodiment.
Figure 7:
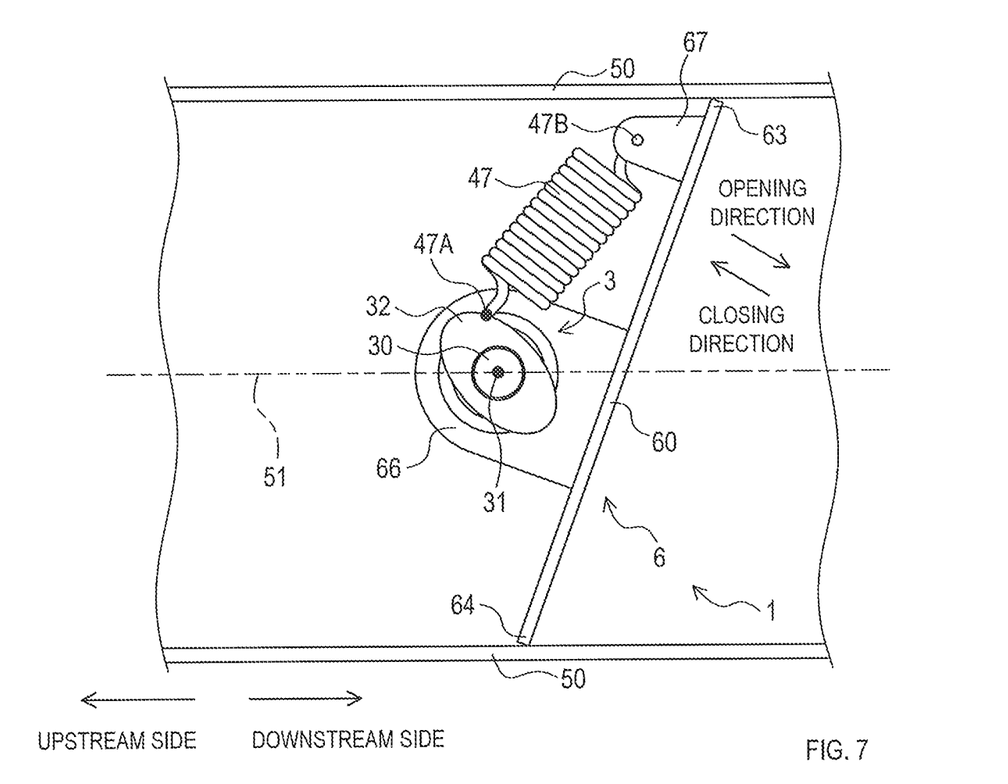
FIG. 7 is a cross-sectional view, taken along the flow direction of the exhaust gas, of the inner pipe of the muffler and the valve device according to the fourth embodiment, in which the valve body of the valve device is positioned in the closed position.

The valve device 1 of the fourth embodiment has a similar configuration to that of the first embodiment, except for a valve body 6 and a third spring 47 (see, FIGS. 6, 7). Hereinbelow, descriptions will be given of differences between the fourth embodiment and the first embodiment.

11. Valve Body

The valve body 6 of the fourth embodiment comprises: a body part 60; first and second arm portions 65, 66; and a coupling member 67 (see, FIGS. 6, 7).

The body part 60 is a plate like member with a substantially circle shape, and an edge of the body part 60 includes first and second side portions 61, 62 formed opposite to each other in a lateral direction, and first and second arc portions 63, 64 formed opposite to each other in a longitudinal direction perpendicular to the lateral direction. Both ends of the first arc portion 63 are respectively joined with one ends of the first and second side portions 61, 62, and both ends of the second arc portion 64 are respectively joined with the other ends of the first and second side portions 61, 62.

The first and second arm portions 65, 66 are respectively provided to the first and second side portions 61, 62 at substantial centers thereof in longitudinal directions, and are opposite to each other in the lateral direction. Also, the first and second arm portions 65, 66 substantially protrude in a direction perpendicular to the lateral direction and the longitudinal direction, and are situated on the upstream side with respect to the body part 60.

Similar to the first embodiment, the valve body 6 is provided rotatable about the rotation axis 30. The rotation axis 30 is situated on the upstream side with respect to the body part 60, and penetrates the valve body 6 in the substantially lateral direction through a substantial center in the longitudinal direction.

That is, the first arm portion 65 is supported rotatably about the first supporting member 33 of the rotation axis 30 that penetrates the first arm portion 65. Specifically, the inner portion of the first supporting member 33 is surrounded by the first arm portion 65, and the outer portion of the first supporting member 33 is situated between the first arm portion 65 and the inner peripheral surface of the inner pipe 50. The second arm portion 66 is, similarly to the first arm portion 65, also supported rotatably about the second supporting member 34 of the rotation axis 30 that penetrates the second arm portion 66.

The coupling member 67 is provided to the body part 60 in a vicinity of the first arc portion 63, and protrudes in the same direction as the first and second arm portions 65, 66 do. To the coupling member 67, a second end 47B of the third spring 47 is connected.

12. Third Spring

The third spring 47 of the fourth embodiment is in a form of a tension coil spring, and functions as a biasing member similarly to the one of the first embodiment (see, FIGS. 6 and 7). The third spring 47 is provided to the rotation axis 30, and at least a part of the third spring 47 is connected to the link member 32. The third spring 47 is situated on the upstream side of the body part 60, and a first end 47A of the third spring 47 is connected to a part of the link member 32 that is situated closer to tops of the first and second arm portions 65, 66 than the central axis 31, and the second end 47B is connected to the coupling member 67.

13. Closed Position and Open Position

In the fourth embodiment, similarly to the first embodiment, the valve body 6 when positioned in the open position is in a state of being arranged along the flow direction of the exhaust gas, and the valve body 6 when positioned in the closed position is tilted with respect to the cross section of the inner pipe 50 (see, FIG. 7). In the valve body 6 positioned in the closed position, the first and second arc portions 63, 64 each abut the inner peripheral surface of the inner pipe 50, and there are no gaps formed between each of the first and second arc portions 63, 64 and the inner peripheral surface of the inner pipe 50.

In the fourth embodiment, similarly to the first embodiment, there are gaps formed between each of the first and second side portions 61, 62 of the valve body 6 and the inner peripheral surface of the inner pipe 50. However, the configuration is not limited to this, and may be such that there are no gaps formed.

14. Rotation of Valve Body

Similarly to the first embodiment, the third spring 47 is provided to the valve body 6 in an expanded manner, and generates a restoring force that contracts the third spring 47 (see, FIGS. 6, 7). Specifically, as the valve body 6 gets closer to the open position, the third spring 47 expands more and the restoring force increases. Also, the restoring force of the third spring 47 generates a torque that rotates the valve body 6 in the closing direction.

Similarly to the first embodiment, when the force applied to the valve body 6 by the dynamic pressure of the exhaust gas exceeds the torque generated by the third spring 47, the valve body 6 rotates in the opening direction.

15. Effects (1) According to the aforementioned embodiment, the biasing member of the valve device 1 is provided inside the inner pipe 50, and thus a space for arranging the valve device 1 can be reduced.

(2) Each of the valve bodies 2, 6 positioned in the closed position is tilted with respect to the cross section of the inner pipe 50, and thus the exhaust gas having reached the valve body 2 or 6 flows toward the first portion 2A along the valve body 2 or 6, and the exhaust gas flow concentrates on the first portion 2A. Consequently, the dynamic pressure of the exhaust gas at the first portion 2A exceeds the dynamic pressure of the exhaust gas at the second portion 2B, and the torque that rotates the valve body 2 or 6 in the opening direction is generated.

This enables, when the dynamic pressure of the exhaust gas rises, to rotate the valve body that is positioned in the closed position and biased in the closing direction by the biasing member in the opening direction, without giving any consideration to an area ratio between the first portion 2A and the second portion 2B in the valve body 2. More specifically, similarly to the aforementioned embodiment, with a structure in which the central axis 31 of each of the valve bodies 2, 6 passes through the substantial center thereof in the longitudinal direction (in other words, the substantial center of the inner pipe 50), the valve body 2 positioned in the closed position can be rotated in the opening direction in response to the dynamic pressure of the exhaust gas rising. Accordingly, the position of the central axis 31 can be determined more flexibly, allowing a more flexible design of the valve device 1.

(3) The central axis 31 of the valve body 2 passes through the substantial center of the inner pipe 50. This facilitates a more uniform forming of the exhaust gas flow path on both sides of the central axis 31. Accordingly, the exhaust gas passing through the valve device 1 can flow more smoothly.

(4) In the first to third embodiments, the biasing member is disposed inside the valve body 2. This allows the exhaust gas to flow more smoothly in the peripheral of the valve body 2.

16. Other Embodiments (1) In the aforementioned embodiments, the central axis 31 defined by the rotating valve body 2 or 6 passes through the substantial center of the inner pipe 50. However, the present disclosure is not limited to this, and the position of the rotation axis 30 may be determined such that the central axis 31 is situated on either the first or second arc portion side with respect to the substantial center of the inner pipe 50. With such a structure, when the dynamic pressure of the exhaust gas rises, similarly to the aforementioned embodiments, the valve body 2 or 6 can be rotated in the opening direction by appropriately adjusting the spring of the biasing member. Accordingly, similarly to the aforementioned embodiments, the opening degree of the inner pipe 50 can be adjusted.

(2) In the aforementioned embodiments, the valve bodies 2, 6 positioned in the closed position each are tilted with respect to the cross section of the inner pipe 50. However, the valve bodies 2, 6 positioned in the closed position each may be oriented substantially parallel to the cross section. In this case, for example, the inner peripheral surface of the inner pipe 50 may be provided with a protrusion to thereby hamper each of the valve bodies 2, 6 positioned in the closed position to rotate in the closing direction. In this case, the position of the rotation axis 30 may be adjusted so that the central axis 31 is situated on either the first or second arc portion side with respect to the substantial center of the inner pipe 50. With such a structure, when the dynamic pressure of the exhaust gas rises, similarly to the aforementioned embodiments, the valve body 2 can be rotated in the opening direction. Thus, similarly to the aforementioned embodiments, the opening degree of the inner pipe 50 can be adjusted.

(3) In the aforementioned embodiments, the valve device 1 is mounted to the vehicle, and provided in the exhaust gas flow path from the engine. However, the application of the valve device 1 is limited to this. The valve device 1 may be provided in another flow path for fluid in the vehicle, or may be provided in a flow path for fluid in a device other than a vehicle. With such structures as describe above, the similar effect can be obtained.

(4) The valve device 1 according to the fourth embodiment may be configured such that the body part 60 is situated on the upstream side in the flow path for fluid. Similarly to the fourth embodiment, the valve device 1 may be configured such that the valve body 6 positioned in the closed position is tilted, and the third spring 47 generates the restoring force that rotates the valve body 6 in the closing direction. This enables to suppress a direct collision of the exhaust gas against the third spring 47, and facilitates a smoother flow of the exhaust gas.

(5) In the valve device 1 according to the first, second, and fourth embodiments, the valve body 1 or 6 is rotated in the closing direction by the restoring force exerted to contract the first spring 40, the second spring 41, or the third spring 47 of the biasing member. However, on the contrary, each of the springs of the biasing member may be arranged in a compressed manner to rotate the valve body 1 or 6 in the closing direction by a restoring force exerted when the spring expands. With these structures as described above, the similar effects can be obtained.

(6) A plurality of functions performed by a single element in the aforementioned embodiments may be achieved by a plurality of elements, or a function performed by a single element may be achieved by a plurality of elements. Also, a plurality of functions performed by a plurality of elements may be achieved by a single element, or a function performed by a plurality of elements may be achieved by a single element. Further, a part of a configuration in the above-described embodiments may be omitted. Moreover, at least a part of a configuration in the aforementioned embodiments may be added to, or may replace, another configuration in the aforementioned embodiments.

What is claimed is:

1. A valve device configured to adjust an opening degree of a flow path for fluid comprising:
   an axial member configured to be fixed to the flow path;
   a valve body rotatable about the axial member, being configured to be rotated in a closing direction in which the opening degree is reduced, and to be rotated, by the use of the fluid flowing down through the flow path, in an opening direction in which the opening degree is increased; and
   a biasing member that is coupled to the axial member inside the flow path, and is configured to bias the valve body to rotate in the closing direction,
   wherein a position where the valve body rotating in the closing direction reaches is a closed position, wherein, when positioned in the closed position, the valve body is tilted with respect to a cross section perpendicular to a flow direction of the fluid in the flow path, and wherein a central axis, which is defined by the valve body rotating about the axial member, passes through a substantial center of the flow path.

2. The valve device according to claim 1,
wherein the biasing member is provided inside the valve body.

3. The valve device according to claim 1,
wherein the valve device is mounted to a vehicle, and
wherein the fluid is an exhaust gas generated by an engine of the vehicle.

4. The valve device according to claim 3,
wherein the valve device is provided in a muffler through which the exhaust gas flows.

5. A valve device configured to adjust an opening degree of a flow path for fluid comprising:
an axial member configured to be fixed to the flow path;
a valve body rotatable about the axial member, being configured to be rotated in a closing direction in which the opening degree is reduced, and to be rotated, by the use of the fluid flowing down through the flow path, in an opening direction in which the opening degree is increased; and
a biasing member that is coupled to the axial member inside the flow path, and is configured to bias the valve body to rotate in the closing direction,
wherein the biasing member includes at least one tension coil spring having a first end connected to the axial member, and a second end connected to the valve body.

6. The valve device according to claim 5,
wherein a position where the valve body rotating in the closing direction reaches is a closed position,
wherein, when positioned in the closed position, the valve body is tilted with respect to a cross section perpendicular to a flow direction of the fluid in the flow path,
wherein the at least one tension coil spring is configured such that, when the valve body is positioned in the closed position, the first end is situated on an upstream side with respect to a reference line, and the second end is situated on a downstream side with respect to a central axis, which is defined by the valve body rotating about the axial member, or, the first end is situated on the downstream side with respect to the reference line, and the second end is situated on the upstream side with respect to the central axis, and
wherein the reference line is a straight line that connects the second end of the at least one tension coil spring and the central axis.

7. The valve device according to claim 5,
wherein the axial member further comprises a link member disposed in a protruding manner from an outer peripheral surface of the axial member, and
wherein the first end of the at least one tension coil spring is connected to the link member.

8. The valve device according to claim 5,
wherein the second end of the at least one tension coil spring is connected to an end of the valve body or in a vicinity thereof.

9. The valve device according to claim 5,
wherein a position where the valve body rotating in the closing direction reaches is a closed position, and
wherein, when positioned in the closed position, the valve body is tilted with respect to a cross section perpendicular to a flow direction of the fluid in the flow path.

10. The valve device according to claim 9,
wherein a central axis, which is defined by the valve body rotating about the axial member, passes through a substantial center of the flow path.

11. The valve device according to claim 5,
wherein the biasing member is provided inside the valve body.

12. The valve device according to claim 5,
wherein the valve device is mounted to a vehicle, and
wherein the fluid is an exhaust gas generated by an engine of the vehicle.

13. The valve device according to claim 12,
wherein the valve device is provided in a muffler through which the exhaust gas flows.

* * * * *